Figure 1:
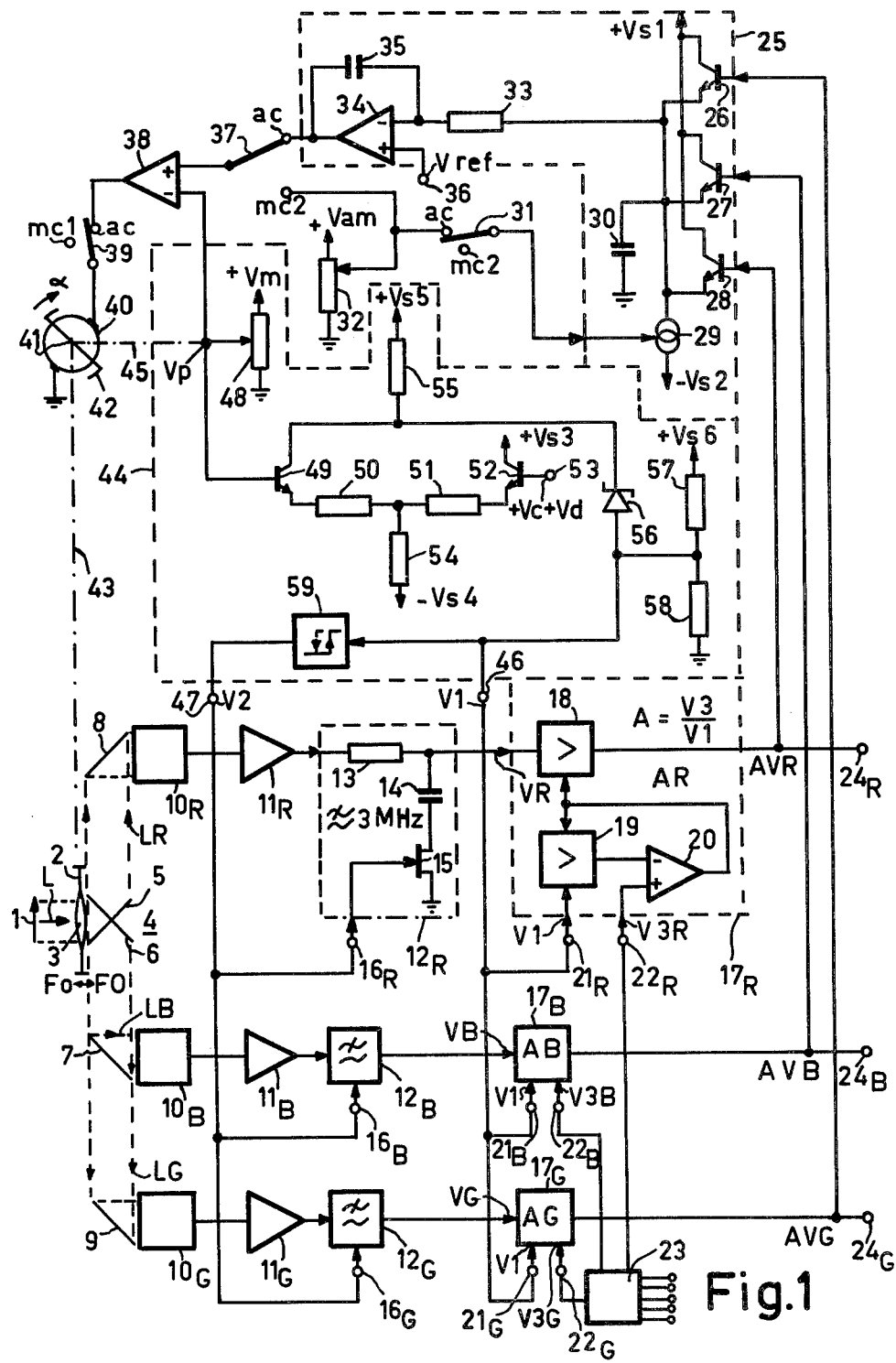

United States Patent [19]

Geurts

[11] 4,174,526
[45] Nov. 13, 1979

[54] TELEVISION CAMERA COMPRISING A DIAPHRAGM CONTROL AND A CONTROLLABLE PICTURE SIGNAL AMPLIFICATION CIRCUIT

[75] Inventor: Martinus F. A. M. Geurts, Breda, Netherlands

[73] Assignee: U.S. Philips Corporation, New York, N.Y.

[21] Appl. No.: 877,079

[22] Filed: Feb. 13, 1978

[30] Foreign Application Priority Data

Feb. 21, 1977 [NL] Netherlands ..................... 7701811

[51] Int. Cl.² .......................................... H04N 5/34
[52] U.S. Cl. ..................................... 358/219; 358/228
[58] Field of Search .............................. 358/219, 228

[56] References Cited

U.S. PATENT DOCUMENTS 3,555,181 1/1971 Thommen ....................... 358/228 X

FOREIGN PATENT DOCUMENTS 1035708 7/1966 United Kingdom ..................... 358/228

Primary Examiner—Robert L. Richardson
Attorney, Agent, or Firm—Thomas A. Briody; William J. Streeter; Edward W. Goodman

[57] ABSTRACT

A television camera having a diaphragm control and a controlled picture signal amplification circuit for keeping a picture signal value substantially constant. A single control system is formed by having the diaphragm opening adjusting element perform the gain control through an electronic control circuit, which takes place at low scene light intensities only. In the automatic control the amplified picture signal is utilized directly for the diaphragm control and, at low light intensities, indirectly for the gain control. With manual control the operator directly influences the diaphragm adjusting element and, consequently, indirectly the gain control at low light intensities. In the automatic control no discontinuities occur in the control characteristic and with manual control operation is simplified.

9 Claims, 3 Drawing Figures

TELEVISION CAMERA COMPRISING A DIAPHRAGM CONTROL AND A CONTROLLABLE PICTURE SIGNAL AMPLIFICATION CIRCUIT

The invention relates to a television camera comprising a diaphragm control and a controllable picture signal amplification circuit for keeping a picture signal value substantially constant at varying scene light intensities, the diaphragm opening being adjustable by means of an adjusting element, the diaphragm control being mainly operative at a scene having higher light intensities and the control of the picture signal amplification circuit mainly taking place at lower scene light intensities.

Such a television camera is disclosed in U.S. Pat. No. 3,555,181. The average value, the peak value or an intermediate value of the picture signal supplied by the picture signal amplification circuit is compared in a signal comparison circuit to a preset desired signal value and, in case of a signal difference, the diaphragm control and/or the amplification circuit are controlled by the difference signal to reduce the difference. In the case of higher scene light intensities only the diaphragm is controlled by the difference signal, in the case of lower scene light intensities only the amplification circuit is controlled by the difference signal and for an average scene light intensity there is a transition from the one to the other control.

For the automatic control described, the transition from the one to the other control is accompanied by a discontinuity in the control characteristic of the entire control system for keeping the picture signal value constant. This discontinuity results from the entirely different control characteristics with the, for example, electromechanical diaphragm control and the electronic control of the picture signal amplification circuit, both having different control rates and properties depending on the nature of the relevant control system.

It is an object of the invention to provide a television camera which has no discontinuity problem for the automatic control, whilst, when an automatic control system is switched off, the television camera can be advantageously operated by a camera operator with varying scene intensities. To this end the camera according to the invention is characterized in that the adjusting element for the diaphragm opening is coupled to an electronic control circuit a signal output of which is connected to a control signal input of the picture signal amplification circuit, readjustment of the adjusting element and a consequent widening or narrowing respectively of the diaphragm opening effecting at lower scene light intensities by means of the control circuit simultaneously a corresponding increase or reduction of the gain factor of the picture signal gain circuit.

A camera suitable for automatic control and manual control, for keeping the picture signal value substantially constant, is characterized in that the camera comprises a switching circuit for switching the diaphragm control off or on respectively, the adjusting element for the diaphragm opening being provided with an element for manual operation.

A further possible embodiment is characterized in that the camera comprises a switch-over circuit having at least a first and a second selector contact and a master contact, the master contact being coupled to the diaphragm adjusting element for the control thereof, the first selector contact associated with an automatic control being connected through a signal comparison circuit to the output of the picture signal amplification circuit and the second selector contact associated with a manual operation being connected to an adjustable bias voltage.

The invention is based on the recognition that it is possible and advantageous to use one sole, automatically or manually operable control system for keeping the picture signal value substantially constant. Herein only the diaphragm control is influenced directly and data are obtained from the adjusting element of the diaphragm opening for the (consequently indirect) control of the picture signal amplification circuit.

With the automatic control the control information for the diaphragm is obtained from the output signal of the picture signal amplification circuit and this control information is explicitly not supplied, as in the known manner, directly to the amplification circuit for gain control. Consequently, the result is a sole control system having a continuous control characteristic instead of the said two independent control systems with different control characteristics resulting in a discontinuous control characteristic for the entire system.

When the adjusting element of the diaphragm is controlled manually information is obtained, as mentioned above, from this element regarding the diaphragm opening which is used as control information for the gain control of the picture signal amplification circuit. The result is that when manually controlling the diaphragm the picture signal amplification is simultaneously influenced in the desired sense so that the camera operator accomplishes simultaneously by means of this single manipulation two effects in the sole control system which together result in the desired constancy of the picture signal value at varying scene light intensities.

A combination of diaphragm and gain control which is advantageous in practice is obtained with a camera which is characterized in that the picture signal amplification circuit has a non-linearly controlled gain factor.

The optimum combination is achieved with a camera which is characterized in that the controlled gain factor has a substantially hyperbolic variation.

To improve the picture quality when displaying a scene having a low light intensity a television camera according to the invention is characterized in that besides the first signal output the said electronic control circuit has a second signal output which is connected to a switch-on, switch-off signal input of a lowpass filter which is included in a series arrangement with the picture signal amplification circuit.

Furthermore a simple construction of the camera is characterized in that the electronic control circuit is provided with a first and a second threshold circuit connected to the first and the second signal output respectively, the signal threshold of the second threshold circuit being passible after that of the first threshold circuit for supplying an output signal.

An optimum picture quality improvement is achieved on display of a picture signal generated by a television camera which is characterized in that the lowpass filter has a frequency band from 0 to the order of magnitude of approximately 3 MHz.

A television camera suitable for colour television is characterized in that in the camera, which comprises several picture signal channels, each signal channel comprises a picture signal amplification circuit whose control signal inputs are through-connected and connected to the signal output of the control circuit.

Figure 2:
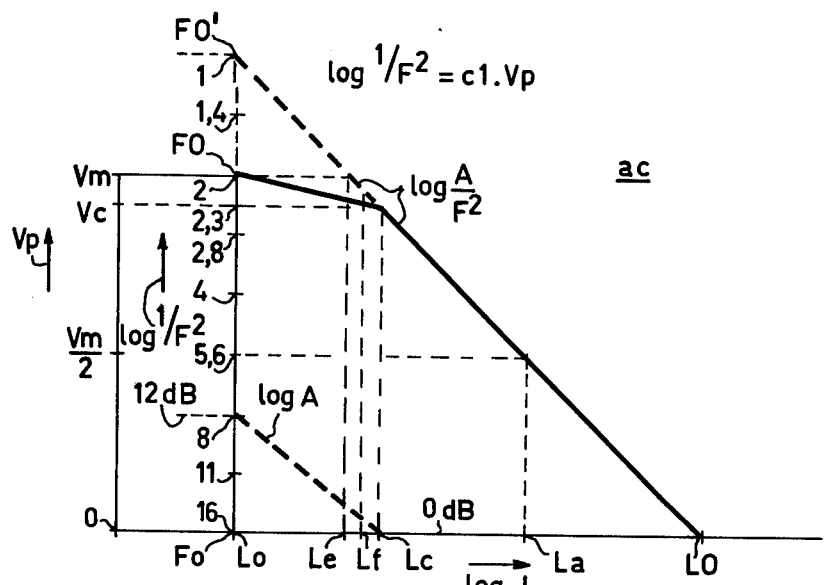
Figure 3:
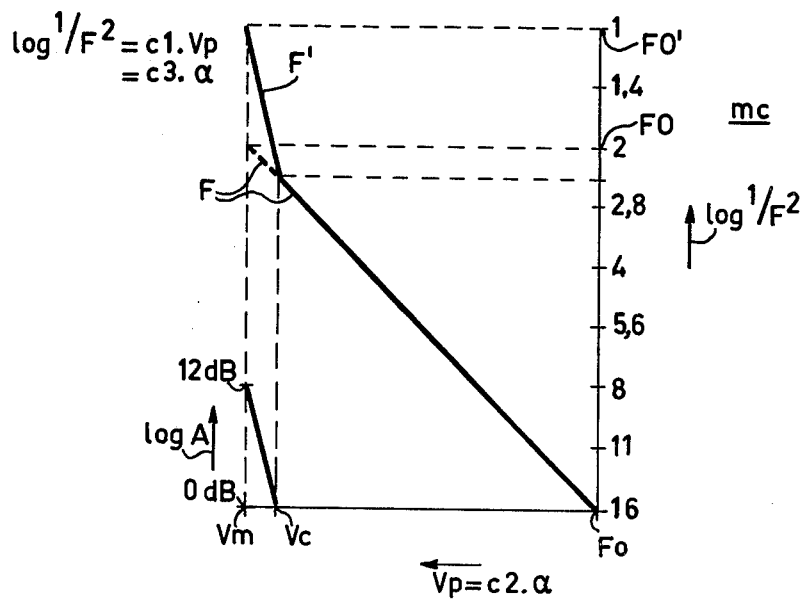

The invention will be further explained by way of example with reference to the following Figures wherein FIG. 1 shows a circuit diagram of a colour television camera according to the invention, FIG. 2 shows a control characteristic in the case of automatic control and FIG. 3 shows a control characteristic in the case of manual operation.

In FIG. 1 reference 1 indicates a scene from which light originates with a light intensity L. The scene illumination having the intensity L is incident through a diaphragm 2 with a diaphragm opening 3 onto an optic system 4. In FIG. 1 the optic system 4 is shown diagrammatically with mirrors 5, 6 and 7 which pass or reflect respectively light of a given colour and light-reflecting mirrors 8 and 9, so that red (R), blue (B) and green (G) light LR, LB and LG respectively is incident on television pickup devices $10_R$, $10_B$ and $10_G$ respectively. The television pickup devices 10, the optical system 4 and the diaphragm 2 are part of a colour television camera of which only the components which are relevant for understanding the invention are diagrammatically shown in FIG. 1. In practice the optical system 4 will be provided with a prismatic colour splitting device and, in known manner, control, deflection, focussing and correction signals will be applied to the television pickup devices 10, which are constructed as pick-up tubes or solid-state pickup devices.

The television pickup devices $10_R$, $10_B$ and $10_G$ are provided with outputs which carry picture signals and which are connected to inputs of signal amplification circuits $11_R$, $11_B$ and $11_G$ respectively. Each of the circuits 11 comprises a pre-amplifier, signal processing and correction circuits and supply at their output picture signals which have a black level set in known manner. The outputs of the circuits 11 are connected to signal inputs of lowpass filters $12_R$, $12_B$ and $12_G$ respectively. As the signal channels in the colour television camera shown in FIG. 1 with the red(R), blue(B) and green(G) picture signal respectively are implemented in the same manner, only lowpass filter $12_R$ is shown in detail.

In the lowpass filter $12_R$ the output of the circuit $11_R$ is connected to ground with a series arrangement of a resistor 13, a capacitor 14 and a transistor 15. The insulated gate electrode of the transistor 15 is connected to a switch-on, switch-off signal input $16_R$ of the filter $12_R$. The junction of the resistor 13 and capacitor 14 is connected to the output, which carries a picture signal VR, of the filter $12_R$ which output is connected to a signal input of a picture signal amplification circuit $17_R$. In the same manner as the filter $12_R$ is provided with the input $16_R$ the filters $12_B$ and $12_G$ are provided with switch-on, switch-off signal inputs $16_B$ and $16_G$, these three inputs being through-connected, whereas the signal outputs which carry a picture signal VB and VG respectively are connected to amplification circuits $17_B$ and $17_G$ respectively.

The amplification circuits 17 are implemented in a corresponding manner and with the circuit $17_R$ which is shown in detail it is indicated that the signal input with the picture signal VR thereon is connected to an input of a signal amplifier 18. A second input of the amplifier 18 and an input of a signal amplifier 19, connected thereto, are connected to the output of a differential amplifier 20. A second input of the amplifier 19 is connected to a control signal input $21_R$ of the circuit $17_R$, the output of the amplifier 19 being connected to the inverting input of the differential amplifier 20 which is connected by means of its non-inverting input to a setting input $22_R$ of the circuit $17_R$. In a corresponding manner the circuits $17_B$ and $17_G$ are provided with control signal inputs $21_B$ and $21_G$ which are through-connected to the input $21_R$ and to setting inputs $22_B$ and $22_G$, each of the inputs $22_R$, $22_B$ and $22_G$ being connected to a different output of a so-called white-balance setting circuit 23. The setting circuit 23 is provided with several inputs for the supply of picture signals and control signals which will be described in detail in the description of the operation of the colour television camera shown in FIG. 1.

The circuits $17_R$, $17_B$ and $17_G$ having gain factors AR, AB and AG are provided with outputs $24_R$, $24_B$ and $24_G$ respectively on which amplified picture signals AVR, AVB and AVG respectively are present. The picture signals AVR, AVB and AVG are available for further signal processing for the ultimate obtention of picture signals which will furnish an optimum picture quality on display. So gamma correction, aperture correction etc. can be applied in known manner. For understanding the invention it is relevant that the peak-to-peak value, the average value or a selected intermediate value of the picture signals AVR, AVB and AVG are kept substantially at a reference value (of, for example, 1 volt) independent of a varying scene light intensity L. To this end the picture signals AVR, AVB and AVG are supplied in the camera shown in FIG. 1 to a signal comparison circuit 25 for an automatic control of the picture signal value. In the circuit 25 the picture signals AVR, AVB and AVG are applied to the bases of transistors 26, 27 and 28 respectively of the npn-type. The collectors of the transistors of the transistors 26, 27 and 28 are through-connected and connected to a terminal having a supply voltage +Vs1 of the voltage source, not further shown here, which is provided with several terminals with supply voltages Vs, in which the ground potential is included. The emitters of the transistors 26, 27 and 28 are through-connected and connected via an adjustable current source 29 to a terminal having a supply voltage −Vs2 and, through a capacitor 30, to ground. The adjustable current source 29 is shown diagrammatically and can be of known construction. For an adjustment of the current source 29 performed from outside the signal comparison circuit 25, the current source is connected through a switch-on, switch-off circuit 31 to the tap of a potentiometer 32 which is connected between a terminal having a voltage +Vam and ground. In the switched-on state the switching circuit 31 has a contact ac which is connected to the current source 29 and to the potentiometer tap, whereas in the switched-off state a free contact mc2 is connected to the current source 29 which is then switched-off.

The junction of the transistor emitters, the capacitor 30 and the current source 29 is connected in the circuit 25 to the inverting input of a differential amplifier 34 through a resistor 33. The inverting amplifier input is connected to the amplifier output through a capacitor 35 whereas the non-inverting input is connected to a terminal 26 to which a reference voltage Vref is supplied. The output of the integrating amplifier (33–36) thus formed which is also the output of the signal comparison circuit 25 is connected to a first selector contact ac of a switching circuit 37 which is provided with a second selector contact mc which is connected to the tap of the potentiometer 32 and with a master contact which is connected to the non-inverting input of a differential amplifier 38. The output of the amplifier 38 is connected through a switch-on, switch-off circuit 39 to a control winding, not shown, of a motor 40, the shaft of which is indicated by 41. The switching circuit 39 is provided with a contact ac which is connected to the output of the amplifier 38 and with a free contact mc1. The motor 40 comprises a manual operating element 42, such as, for example, a diaphragm ring which can be rotated over a given angle α, by means of which the motor shaft 41 can be given a certain position or a given number of revolutions respectively. The motor shaft 41 has a mechanical coupling 43 to the diaphragm 2 so that the diaphragm opening 3 has a given opening in dependency on the number of motor shaft revolutions and the motor shaft position. The components 40 to 43 inclusive constitute together an adjusting element (40–43) for the diaphragm opening 3. This diaphragm opening adjusting element (40–43) is described for use with a diaphragm construction having a mechanical shutter but an electronic implementation would also be possible when a diaphragm 2 is used provided with a liquid crustal which passes more or less light in dependency on a voltage applied across it.

In accordance with the invention the adjusting element (40–43) for the diaphragm opening 3 is coupled to an electronic control circuit 44 which coupling is shown in FIG. 1 as a mechanical coupling 45 to the motor shaft 41. The control circuit 44 is provided with a first and a second signal output 46 and 47 respectively which are connected to the control signal inputs $21_R$, $21_B$ and $21_G$ of the circuit 17 and the switch-on, switch-off signal inputs $16_R$, $16_B$ and $16_G$ respectively of the filters 12.

In the embodiment of the control circuit 44 shown in FIG. 1 the mechanical coupling 45 is connected to a tap or wiper, driven thereby, of a potentiometer 48 which is arranged between a terminal, which carries a voltage +Vm, and ground. The potentiometer tap carrying a voltage Vp depending on the position of the wiper has an electric connection to the inverting input of the differential amplifier 38 and to the base of an npn-transistor 49. The emitter of the transistor 49 is connected through two resistors 50 and 51 in series with the emitter of an npn-transistor 52. The collector of the transistor 52 is connected to a terminal which carries a supply voltage +Vs3, whereas the base is connected to a terminal 53 to which a bias voltage +Vc+Vd is applied. The node of the resistors 50 and 51 is connected through a resistor 54 to a terminal carrying a supply voltage −Vs4. The collector of the transistor 49 is connected through a resistor 55 to a terminal carrying a supply voltage +Vs5 and, furthermore, to the cathode of a Zener diode 56. The anode of the Zener diode 56 is connected to the node of two resistors 57 and 58 which are arranged in series between a terminal carrying a supply voltage +Vs6 and ground. The anode of the Zener diode 56 is connected directly to the output 46 of the control circuit 44 and to the output 47 through a Schmitt triggering circuit 59. As indication for the operation of the control circuit 44 it should be noted that this circuit is provided in the set-up described, with a first threshold circuit (49–58) and a second threshold circuit (49–59) which is at the same time a limiter circuit.

The colour television camera described with reference to FIG. 1 has an automatic control (ac) of, directly, the diaphragm 2, and, indirectly, at low light intensities L, also of the amplification circuits $17_R$, $17_B$ and $17_G$ when the switching circuits 31, 37 and 39 are in the position with through-connected contacts ac. Manual control (mc) of the diaphragm 2 and, at low light intensities L, also indirectly of the amplification circuits 17 can be done in two manners: on the one hand by switching-off the switching circuit 39, that is to say by through-connecting the free contact mc1 and, on the other hand, by connecting the contacts mc2 of the switching circuits 31 and 37 when the switching circuit 39 is switched-on. In the first case (mc1) the manual operating element 42 is operated directly by a camera operator and in the second case (mc2) the potentiometer 32 is readjusted for changing the diaphragm opening 3.

The switching circuits 31, 37 and 39 can be constructed as mechanical switches or with switching elements which are implemented electrically or electronically.

The operation of the colour television camera shown in FIG. 1 will be described with reference to the control characteristic shown in FIG. 2 for the automatic control ac and with reference to the control characteristic shown in FIG. 3 for manual control mc. Independent of the selection of operating mode ac or mc the amplification circuits 17 operate in the following manner. It is assumed that the identical amplifiers 18 and 19 have a gain factor P and the differential amplifier 20 a gain factor Q. Starting from an output voltage V20 of the differential amplifier 20 whilst a voltage V1 and V3R respectively are supplied to the inputs $21_R$ and $22_R$ it follows that:

$$V20 = Q(V3R - P \cdot V1 \cdot V20) \tag{1}$$

from (1) it follows that:

$$V20 = (Q \cdot V3R)/(1 + Q \cdot P \cdot V1) \tag{2}$$

For the output voltage of the amplifier 18 it follows that:

$$AVR = P \cdot VR \cdot V20 \tag{3}$$

From (2) and (3) it follows that:

$$AVR = (Q \cdot P \cdot V3R)/(1 + Q \cdot P \cdot V1) \cdot VR \tag{4}$$

It is assumed that $Q \cdot P \cdot V1 \gg 1$, \hfill (5)

so that it follows from (4) and (5) that:

$$AVR = (V3R/V1) \cdot VR \tag{6}$$

From (6) it appears that for the gain factor AR=AVR/VR of the circuit $17_R$ it holds that:

$$AR = V3R/V1 \tag{7}$$

For the amplification circuits 17 it holds in the general sense that:

$$A = V3/V1 \tag{8}$$

In FIG. 1 it is shown that the voltages V3R, V3B and V3G are supplied separately by the white-balance setting circuit 23. The voltage V3G is in known manner a given D.C. voltage and the circuit 23 supplies a setting voltage V3R and V3B respectively with which it is achieved that for a white coloured part in the scene 1 the peak-to-peak values of the picture signals red and blue are equal to the peak-to-peak value of the green picture signal. The setting voltages V3R and V3B are determined with a setting procedure for the white-balance wherein the scene 1 comprises a test picture having a white part and an associated key signals and the three picture signals are applied to the circuit 23. After the setting procedure, which can be performed manually or automatically, the circuit 23 furnishes the selected D.C. voltage V3G and the associated setting voltages V3R and V3B.

In the general gain factor $A = V3/V1$ the voltage V1 is the control voltage derived from the control circuit 44. The control voltage V1 is determined by the voltage Vp at the tap of the potentiometer 48. With a voltage Vp which is smaller than the voltage Vc the transistor 49 is cut off because the voltage $+Vc+Vd$ at the base of the conducting transistor 52 provides that the voltage in the node of the resistors 50, 51 and 54 exceeds the voltage $V_p$ minus the base-emitter threshold voltage of the transistor 49. In the cutoff state of the transistor 49 the resistors 55, 57 and 58 and the Zener diode 56 supply, depending on the voltage distribution across them, a constant voltage (V1) at the output 46. From the voltage value $Vp=Vc$ at the base of the transistor 49 (Vd being equal to the voltage drop across the resistor 51) the transistor 49 is made conductive, so that the voltage at the junction point of the collector of the transistor 49, the resistor 55 and the Zener diode 56 decreases, which decrease in voltage occurs equally large in the voltage V1. For the gain factor $A = V3/V1$ it holds that it increases as a consequence thereof, which is approximately plotted in FIG. 3 by means of the graph log A as a function of the voltage Vp. Likewise the graph log A is plotted in FIG. 2 but in this Figure as a function of log L, L representing the scene light intensity. In FIG. 2 log L is plotted along the abscissa and the voltage Vp and log $1/F^2$ are plotted along the ordinate, F indicating the diaphragm setting of the diaphragm 2 of FIG. 1 from a minimum diaphragm opening 3 with Fo=16 to a maximum diaphragm opening 3 FO=2. The light intensity L is plotted from a minimum light intensity Lo to a maximum light intensity LO.

In FIG. 2 the graph log $A/F^2$ is ploted as control characteristic wherein log $1/F^2 = c1 \cdot Vp$, c1 being equal to a constant. With this control characteristic it is plotted that at a given value La of the scene light intensity L a diaphragm setting F=5.6 is found, which means that in the stable state of the control system a desired value is present in one of the picture signals AVR, AVB or AVG. It is assumed that the tap of the potentiometer 32 is set near ground potential and that in this situation the current source 29 carries a very low current, then the circuit comprising the transistors 26, 27 and 28, the current source 29 and the capacitor 30 operates as a peak-value detector for the three picture signals AVR, AVB and AVG. The peak value of the highest picture signal minus the base-emitter threshold voltage $V_{BE}$ of the transistor 26, 27 or 28 is then present at the inverting input of the differential amplifier 34 and, in the stable state of the control system, it must be equal to the voltage Vref present at the non-inverting input of the amplifier 34. For a desired picture signal peak-to-peak of, for example, 1V, it follows that $Vref = 1V - V_{BE}$. Reducing the light intensity L from the value La downwards will result in that in the first instance the voltage across the capacitor 30 and, consequently, the voltage at the inverting input of the amplifier 34 becomes smaller than the voltage Vref, so that the motor 40 is controlled by means of the voltage difference via the power amplifier 38 and the diaphragm opening 3 is widened, that is to say F is decreased, until the highest peak value of the picture signals AVR, AVB and AVG again gives the voltage Vref at the inverting input of the differential amplifier 34.

Adjusting the tap of the potentiometer 32 from near ground potential to a higher positive voltage implies that the current source 29 starts carrying more current. As a consequence no top value detection will take place anymore but the average value or an intermediate value is then detected and kept equal to the voltage Vref by the control system.

As described above, only the diaphragm control for higher light intensities L is effected. In FIG. 2 the light intensity Lc indicates the light intensity at which, in the control system, the potentiometer voltage Vp becomes equal to the voltage Vc. For lower light intensities Lc not only the diaphragm control takes place but, through the coupling 45, the control circuit 44 of FIG. 1 is made operative for controlling the gain factor $A = V3/V1$. The result is the owing to the contribution of the amplification circuit 17 the diaphragm opening 3 need not be opened so wide to obtain the voltage Vref at the inverting input of the differential amplifier 34. It holds for the control characteristic of FIG. 2 associated with the stable state of the control system that this will continue without any discontinuities which is plotted by means of the graph log $A/F^2$. With the maximum opening with FO=2 of the diaphragm 2 and the consequent maximum signal gain (12 dB at the graph log A) it is achieved that the diaphragm setting is virtually increased until the value FO', which virtual increase is caused by increasing the gain factor A by means of the threshold circuit (49–58) in the control circuit 44.

Starting from a camera having no gain control it is in practice, for example, assumed for this camera that with a diaphragm setting F=2 the scene light intensity must be approximately 500 lux, so as shown in FIG. 2 Le=500 lux. With the camera shown in FIG. 1 it is achieved that a virtual increase in the diaphragm setting occurs until F=1. As the light intensity of the light passed by the diaphragm opening 3 is a square-low function of the change in the diaphragm setting (proportional $1/F^2$), it follows that it holds for Lo that: $Lo = (\frac{1}{2})^2 \cdot 500 = 125$ lux, whereas for LO it follows that: $LO = (16/2)^2 \cdot 500 = 32,000$ lux. It appears that at low light intensities L a picture signal having the desired peak value, the average value or another value can still be generated with the camera acoording to the invention.

It is assumed that, for example, with the light intensity Le the control voltage V1 of the control circuit 44 of FIG. 1 has decreased so far that the Schmitt triggering circuit 59 provided in the threshold circuit (49–59) changes state so that the voltage V2 at the output 47 beconed a positive voltage relative to the ground potential and renders the transistors 15 in the low pass filter 12 conductive and, consequently, puts the filters 12 in operation. Frequency- limited picture signals VR, VB and VG are the result. An increase in the light intensity L, which occurs immediately thereafter, causes a change of state not before a value Lf has been obtained, which hysteresis effect avoids instabilities with a repeated change in state. The use of the switchable low-pass filters 12 is advantageous when with low light intensities L an improved signal-to-noise ratio is desired on display. In practice it appears that a frequency limitation to the order of magnitude of approximately 3 MHz furnishes an acceptable quality advantage on display. Instead of preceding the circuits 17, the filters 12 may be positioned behind them with equal advantage.

The camera shown in FIG. 1 is represented as a colour television camera but the control circuit 44 can be used with equal advantage with a black-white television camera; the only difference is that the signal channels B and G are missing. The construction as colour television camera has the additional problem of the white-balance for which the adjusted, unequal gain factors AR, AB and AG must each change in the same proportion. In the camera according to the invention this has been solved in a simple manner by using the same multiplication factor $1/V1$ for all three amplification circuits $17_R$, $17_B$ and $17_G$.

Instead of using amplification circuits 17 with gain factor $A = V3/V1$, circuits having a different gain factor, for example $A' = V4 \cdot V5$ may be used. As, in practice, it appeared, however, to be advantageous to use a non-linearly controlled gain factor, this implies that the control voltage V4 or V5 must change non-linearly. The non-linear variation has the result that in a small diaphragm control range from $F = 2.3$ to 2 a change in gain of 12 dB may occur, with which the gain control is made operative and becomes apparent in a smooth, not abrupt, manner. Using the gain factor $A = V3/V1$ where V1 is the controlled voltage results in that, with a linear voltage change which can be realized in a simple manner, as described for the control circuit 44, the gain factor A automatically changes non-linearly, namely hyperbolically. The hyperbolic change in the gain control gives approximately, within approximately a deviation of + or − 1dB, a logarithmic variation which is plotted in the FIGS. 2 and 3.

The implementation of the picture signal amplification circuit 17 with the control input 21 for the gain control and the setting input 22 which can be used for a setting which can be done both statically and dynamically offers the possibility to perform further corrections through the setting input 22 such as, for example, a multiplicative shading correction.

FIG. 3 shows for manual control mc the control characteristic F, F' in which there are plotted along the ordinate log $1/F^2$ equal to the diaphragm setting and along the abscissa the potentiometer voltage $Vp = c2 \cdot \alpha$, c2 being equal to a constant and $\alpha$ being the angular rotation of the diaphragm ring as control element 42 of FIG. 1. It follows from log $1/F^2 = cl \cdot Vp$ that log $1/F^2 = c3 \cdot \alpha$, c3 being equal to a constant.

With a first mode (mc1) of the manual control mc the switching circuit 39 is unactuated. By changing the angle $\alpha$ by means of the diaphragm ring as manual control element 42 the setting of the diaphragm 2 is changed in accordance with the graph F of FIG. 3. For the angle $\alpha$ corresponding to the threshold voltage Vc increasing the angle $\alpha$ not only results in that that the diaphragm opening 3 is increased further but that, simultaneously, through the control circuit 44 by means of its output voltage V1 the gain factor A of the picture signal amplification circuit 17 is increased. The result is that the graph F' is followed, so that the control characteristic F, F' occurs. There is a virtual reduction of the diaphragm setting of the actually lowest possible value $FO = 2$ until the virtual value reaches $FO' = 1$.

For the second mode (mc2) of manual control mc contacts mc2 are through-connected in the switching circuits 31 and 37 whereas the switching circuit 39 is in the position wherein the contact ac is through-connected. Now the potentiometer 32 operates as manual control element with which the control winding of the motor 40 is supplied with power through the power amplifier 38 until it is achieved that the voltage Vp at the tap of the potentiometer 48 is equal to the voltage at the tap of the potentiometer 32. The control characteristic F, F' of FIG. 3 also holds for the manual control mode mc2. The second mode of manual control mc2 can, for example, be advantageous in case of remote control of the setting of the diaphragm 2.

With manual control mc the camera operator has the advantage that the single adjustment of the angle $\alpha$ of the diahragm ring as control element 42 or of the tap of the potentiometer 32 simultaneously influences at low light intensities the diaphragm and the gain control and the bandwidth limiting.

What is claimed is:
1. A television camera comprising a diaphragm control and a gain controllable picture signal amplification circuit for keeping a picture signal value substantially constant at varying scene light intensities, an adjusting element for adjusting the diaphragm opening, the diaphragm control being mainly operative at a scene having higher light intensities and the control of the picture signal amplification circuit mainly taking place at lower scene light intensities, an electronic control circuit coupled to the adjusting element, said control circuit having a first signal output coupled to a control signal input of the picture signal amplification circuit for providing that at lower scene light intensities and upon a readjustment of the adjusting element and a consequent change of the diaphragm opening simultaneously a change of the gain factor of the picture signal gain circuit occurs.

2. A television camera as claimed in claim 1, wherein the camera comprises a switching circuit for switching the diaphragm control off or on respectively, the adjusting element for the diaphragm opening having an element for manual operation.

3. a television camera as claimed in claim 1, wherein the camera comprises a signal comparison circuit, and a switching over circuit having at least a first and a second selector contact and a master contact, the master contact being coupled to the diaphragm adjusting element for the control thereof, the first selector contact associated with an automatic control being coupled through said signal comparison circuit to the output of the picture signal amplification circuit, and the second selector contact associated with a manual operation being connected to an adjustable bias voltage.

4. A television camera as claimed in claim 1 wherein the picture signal amplification circuit has a non-linearly controlled gain factor.

5. A television camera as claimed in claim 4, wherein the controlled gain factor has a substantially hyperbolical variation.

6. A television camera as claimed in claim 1, further comprises a lowpass filter series coupled to said picture signal amplification circuit, and wherein said electronic control circuit has a second signal output which is coupled to a switch-on and switch off control signal input of said lowpass filter.

7. A television camera as claimed in claim 6, wherein the electronic control circuit comprises a first and a second threshold circuit coupled to the first and the second signal outputs respectively, the signal threshold of the second threshold circuit being passible after that of the first threshold circuit for supplying an output signal.

8. A television camera as claimed in claim 6 wherein the lowpass filter has a frequency pass band from 0 to the order of magnitude of approximately 3 MHz.

9. A television camera as claimed in claim 1, suitable for colour television, wherein the camera comprises several picture signal channels, each signal channel comprising one of said picture signal amplification circuit, the control signal inputs being interconnected and coupled to the first signal output of the control circuit.

* * * * *